July 6, 1948.    F. C. HAWKINS    2,444,604
SEAT MOUNTING
Filed May 27, 1944
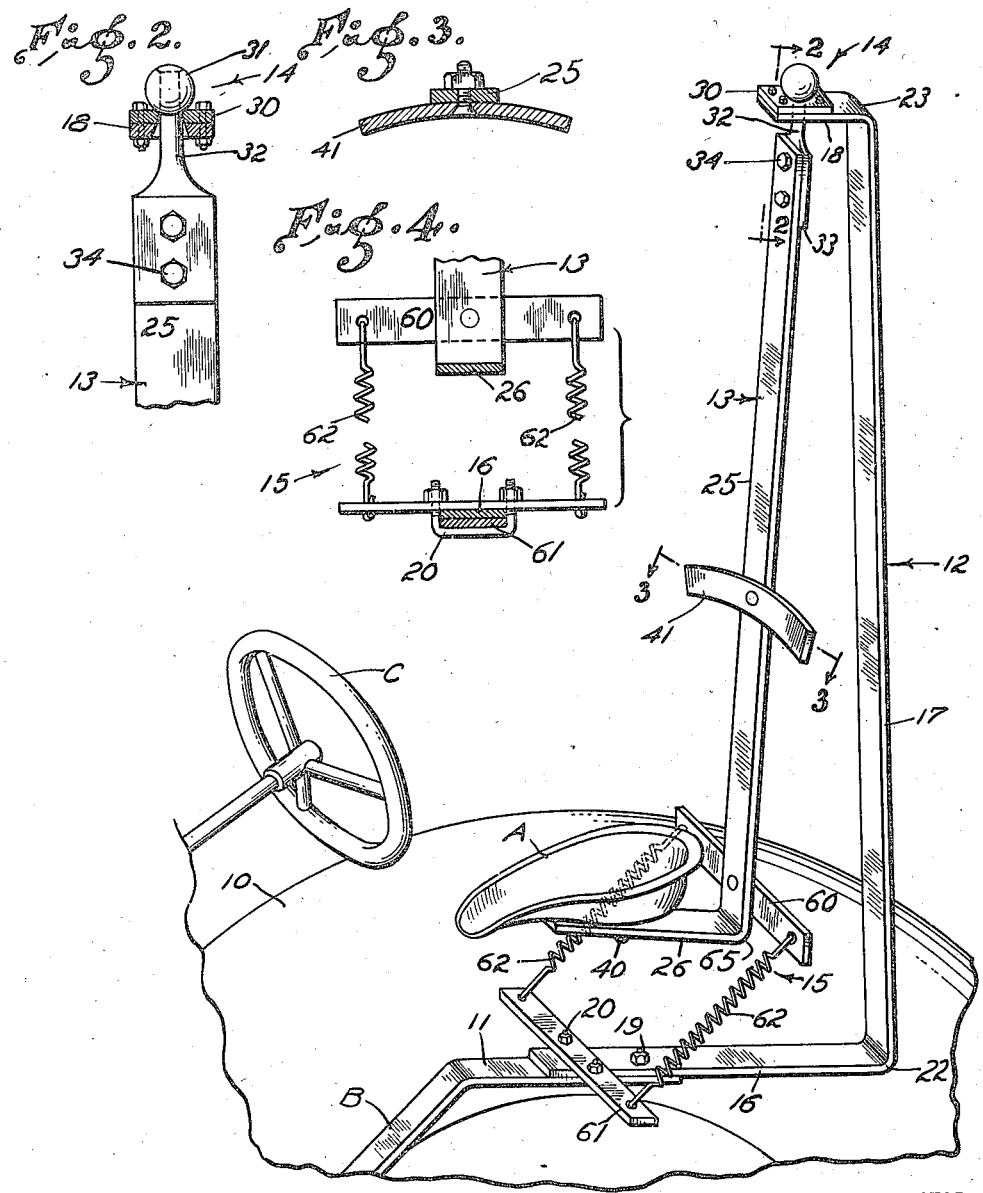
INVENTOR.
Floyd C. Hawkins
BY
Attorney Patented July 6, 1948

2,444,604

UNITED STATES PATENT OFFICE 2,444,604

SEAT MOUNTING

Floyd C. Hawkins, Arcadia, Calif.

Application May 27, 1944, Serial No. 537,622

4 Claims. (Cl. 155—51)

This invention has to do with a seat mounting and it has particularly reference to such a device applicable, generally, to machines such as tractors, farm implements, road machinery, etc. It is a general object of this invention to provide a seat mounting which is simple, practical and inexpensive of construction and which provides a comfortable seat for the operator of a unit such as I have referred to.

Various machines used commercially or industrially require an operator and are commonly equipped with a seat for the convenience of the operator. An example of such a machine is a tractor. However, other such machines are to be found for use in road work and in various commercial and industrial uses. When I refer to a tractor or a tractor seat I, of course, mean to include those other situations or machines presenting problems or conditions similar to those encountered in connection with tractors.

The usual tractor has a steering gear or wheel, suitable controls, and a seat located convenient for the operator. The usual seat is a pressed metal structure made serviceable for use on tractors and it is ordinarily supported on a simple projecting arm or bracket fixed to a suitable part of the tractor. Such seat supporting arms have some spring or resiliency. However, the usual construction is such that the seat is subject to excessive jarring and vibration and is very uncomfortable and tiring for the operator.

It is an object of my invention to provide a seat mounting for tractors, or the like, whereby the seat is allowed a limited free motion relative to the tractor so that jarring and vibration ordinarily communicated to the seat are checked or dampened. With the seat mounting of the present invention the operator is maintained in working position relative to the controls of the tractor yet has certain freedom of movement so that his body does not follow all of the movements of the tractor.

Another object of my invention is to provide a seat mounting of the general character referred to which is extremely simple and inexpensive of manufacture. By my invention I provide a construction involving simple, inexpensive parts that can be easily and quickly applied to a tractor. The materials and construction involved in the device of the present invention are simple and inexpensive and the device is applicable to the ordinary tractor construction without change or reconstruction of any of the parts. The device of the present invention is in the nature of a unit to be added to or inserted in a tractor construction and does not require reconstruction or modification of the tractor.

Another object of my present invention is to provide means which I incorporate in the seat mounting which yieldingly checks movement of the seat and yet allows a limited universal movement of the seat while maintaining the operator in position for full control of the tractor.

The various objects and features of my invention will be fully understood from the following detailed description of a typical preferred form and application of my invention, throughout which description reference is made to the accompanying drawings, in which:

Fig. 1 is a perspective view of the seat mounting of the present invention shown applied to a typical tractor. Fig. 2 is an enlarged detailed sectional view of the mounting means provided for supporting the arm of the mounting from the frame thereof, being a view taken substantially as indicated by line 2—2 on Fig. 1. Fig. 3 is a transverse sectional view taken substantially as indicated by line 3—3 on Fig. 1, and Fig. 4 is a detailed sectional view illustrating the stabilizing means provided by the present invention.

In the drawings I have shown my invention applied to a typical tractor and have shown it employed for supporting the seat A of the tractor, from the seat mounting bracket B of the tractor, so that it is in working position relative to the control C of the tractor. In accordance with the usual tractor construction the seat supporting bracket projects upwardly and rearwardly between the fenders 10 of the tractor and has its upper rear end portion 11 formed to extend substantially horizontally and to support the seat A. In the usual construction the seat A is a metal bucket-type seat and the seat and the bracket part 11 are formed with openings so that the seat is bolted to the bracket. In the usual tractor construction the lower or inner end of the bracket B is fixed to a part of the tractor and the bracket is shaped and proportioned so that it has a certain amount of spring or resiliency.

I am not concerned with the details of the bracket B or its mounting and, therefore, have confined my illustration to the upper end portion of the bracket B, which usually serves to directly support the seat A.

The device or construction of the present invention is in the form of a unit insertable between the bracket B of the tractor and the seat A thereof, so that it supports the seat from the bracket for certain limited or stabilized movement.

The device of the present invention in its preferred form includes a frame 12 adapted to be connected to the bracket B to form an extension thereof, an arm 13 supported from the frame 12 through a universal mounting means 14, and adapted to carry the seat A of the tractor, and means 15 for stabilizing movement of the arm 13 relative to the frame 12.

The frame 12 which forms primarily an extension of the tractor bracket B includes a base 16 adapted to be secured to the part 11 of the bracket B, a post 17 projecting upwardly from the base 16 rearward of the normal position of the seat A and an arm 18 at the upper end of the post 17.

The base 16 of the frame is a part formed to normally extend substantially horizontally or in a direction conforming to that of the part 11 of the bracket B and in practice it may be secured to the part 11 of the bracket B in any suitable manner. In the preferred form of the invention I make the base 16 of the frame a simple part, rectangular in cross section, and I secure it to the part 11 of the bracket by a bolt 19 passed through registering holes in the parts 11 and 16 and by a U-bolt 20 which is carried by a part of the means 15 to embrace overlapping portions of the parts 11 and 16, as is clearly shown in Figs. 1 and 4 of the drawings. The base 16 projects somewhat rearward from the part 11 of the bracket B and supports the post 17 so that it projects vertically at a position spaced a suitable distance rearward of the normal position of the seat A.

The post 17 may be a simple, straight, vertically disposed member formed integral with the base 16 and the arm 18 at the upper end of the post 17 may be an integral continuation of the post formed by bending the upper end portion of the post forward, as shown in Fig. 1. From an examination of Fig. 1 of the drawings it will be apparent that the frame 12, having the several parts 16, 17 and 18, is easily and inexpensively formed of a single length of material by simply providing two simple bends in such length of material, one bend at the point 22 where the base 16 joins the post 17 and the second bend at 23 where the arm 18 joins the post 17.

The arm 13 is connected to the support 18 by the means 14 so that it depends therefrom and has a limited free or universal movement. The arm 13 has a body part 25 which may be straight and which normally extends downwardly and slightly forwardly from the support 18. A seat rest 26 projects forward from the lower end of the body 25 of the arm to carry the seat A of the tractor.

The means 14 may vary widely in construction and is primarily provided to connect the arm 13 with the support 18 of the frame 12 so that its lower end portion is free to move within certain limits. In the particular construction illustrated the means 14 includes a socket plate 30 secured to the arm support 18 and a ball 31 resting in the socket of the plate and a stem 32 depending from the ball 31 to extend through registering openings in the plate 30 and a support 18. The stem 32 is flattened to form a part 33 suitable for being bolted or otherwise connected to the upper end of the arm body 25. In the particular case illustarted bolts 34 are shown releasably connecting the part 33 and the upper end of the body 25. Further, in the drawings the socket plate 30 is shown detachable from the mounting 18 so that it can be removed and renewed if excessive wear occurs between the ball and the plate.

The seat rest 26 at the lower end of the body 25 of arm 13 may be formed by bending or deflecting the lower end portion of the body forward so that it assumes an angle suitable for supporting the seat A. In practice bolts 40, or the like, may be provided for securing the seat A to the part 26 corresponding to the manner in which the seat is normally secured to the part 11 of the bracket B.

It is desirable in practice to have a back rest for the operator and, therefore, I provide a cross member in the form of a back rest 41 on the body 25 of the arm 13. It is to be understood, of course, that the back rest may be located, shaped, and otherwise formed to provide a convenient rest for the back of the operator.

With the construction above described the seat A would be supported from the support 18 so that the arm 13 is substantially vertical and because of the universal mounting means 14 the seat would have a free swinging motion desirable in some respects but not sufficiently stable for practical use.

By my present invention I provide the stabilizing means 15 which normally yieldingly holds the arm 13 in a forward position, that is, so that it extends downward and forward from the support 18, and which stabilizes or yieldingly checks lateral movement of the arm. The preferred form of stabilizing means illustrated in the drawings includes a cross arm 60 on the arm 13, a cross arm 61 on the frame 12, and helical tension springs 62 connecting the cross arms. In practice the cross arms may vary considerably in size or length and their location can be varied without departing from the spirit of the invention. I prefer to pivotally support one of the cross arms so it has an equalizing action at all times. In the particular case illustrated and in the preferred form of the invention the cross arm 60 is pivotally secured to the arm 13 at the lower end portion of the body 25 thereof, or in the vicinity of the point of connection 65 between the body 25 and seat rest 26.

The cross arm 61 is rigidly secured to the construction at the vicinity of the forward end of the base 16 of the frame. It is convenient in practice to actually secure the cross arm 61 to the base 16 of the frame and in the construction shown I employ a U-bolt 20 carried by the cross arm 61 to embrace the parts 11 and 16 so that these parts are tied together and the cross arm is anchored to them through the simple U-bolt connection.

The tension springs 62 are simple, helical tension springs having their ends fixed to the outer end portions of the cross arms, the corresponding ends of the cross arms being joined by a tension spring so that the combination of cross arms and tension springs forms a substantially rectangular structure, as will be apparent from an examination of Fig. 1 of the drawings.

The cross arms and the springs, above referred to, are mounted and proportioned so that the springs 62 normally hold the seat A in what I will term a forward position, that is, so that the arm 13 extends down and forward from the support 18. When the operator places his weight upon the seat A the arm tends to swing rearwardly and consequently tension is placed upon the springs 62 so that they yieldingly resist the rearward movement of the seat. The action just described results in a yielding support for the seat allowing suitable forward and aft movement of the seat relative to the tractor, the rearward movement being checked by the action of the springs 62.

The cross arms and springs of the means 15 normally hold the seat A central, or in line with the frame, and in proper position relative to the control C of the tractor. The universal mounting means 14 allows for free side movement or universal movement of the arm so that as the tractor tips from side to side the arm can swing to either side. This swinging or side motion of the arm is yieldingly checked by the action of the springs 62 through their action or tendency to at all times maintain the seat in the central position. This action is balanced or equalized by the pivotal mounting of arm 60. It will be understood, of course, that in action or operation the movements of the seat are not confined to fore and aft motion or to lateral motion, but rather the movements or motions of the seat will be in various directions and will, in all cases, be yieldingly checked or restrained by the springs 62.

From the foregoing description it will be apparent how the unit or mounting of the present invention can be quickly and effectively inserted between the seat A and the mounting bracket B of the tractor, it being merely necessary to remove the seat A from part 11, apply the base 16 to part 11, and then apply the seat A to the part 26 of the arm 13. Through this simple application the device is arranged in place and is ready for operation.

During operation the device utilizes all of the spring and resiliency inherent in the bracket B and adds a general resiliency or softness by reason of the spring or flexure that occurs in the frame 12 and the arm 13, it being apparent that a certain amount of springing action will occur at the points 22, 23 and 65. The universal mounting 14 allows for free universal movement of the seat while the means 15 normally maintains the seat in the proper position and yieldingly resists deflection of the seat from that position. As the tractor operates the jars and vibration that are normally communicated directly to the seat A through the bracket B are dampened through the construction of the present invention and any pitching or violent movements of the tractor are absorbed through the flexibility and construction of the mounting of the present invention, particularly through the universal means 14 and the stabilizing means 15.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A seat mounting including a frame to be secured to a support to project upwardly therefrom, a seat carrying arm universally secured to the upper portion of the frame, the frame and arm being flexible to allow vertical movement of the seat, and means yieldingly stabilizing lateral movement of the arm including a pair of springs connecting the arm and frame.

2. A seat mounting including a frame to be secured to a support to project upwardly therefrom, a seat carrying arm having its upper end universally secured to the upper portion of the frame and having a seat support at its lower end, and means yieldingly stabilizing movement of the arm including cross arms on the arm and frame and springs connected between the cross arms, one of the cross arms being pivotally mounted.

3. A seat mounting including a frame to be secured to a support to project upwardly therefrom, a seat carrying arm having its upper end universally secured to the upper portion of the frame and having a seat support at its lower end, and means yieldingly stabilizing movement of the arm including cross arms on the arm and frame and springs connected between the cross arms, one of the cross arms being pivotally mounted and the other being rigidly mounted.

4. A seat mounting including a frame to be secured to a support to project upwardly therefrom, a seat carrying arm having its upper end universally secured to the upper portion of the frame so the arm depends therefrom, the arm having a seat support at its lower end, and means yieldingly stabilizing movement of the arm including cross arms on the arm and frame and springs connected between the cross arms, the cross arm on the seat carrying arm being pivotally mounted.

FLOYD C. HAWKINS.

REFERENCES CITED

The following references are of record in the file of this patent:

UNITED STATES PATENTS

| Number | Name | Date |
| --- | --- | --- |
| 225,006 | Gardner | Mar. 2, 1880 |
| 297,108 | Bunker | Apr. 22, 1884 |
| 354,043 | Connolly | Dec. 7, 1886 |
| 420,430 | Banks | Feb. 4, 1890 |
| 446,659 | Bunker | Feb. 17, 1891 |
| 557,494 | Davy | Mar. 31, 1896 |
| 1,093,042 | Etherington | Apr. 14, 1914 |
| 1,229,488 | Lindskoog | June 12, 1917 |
| 1,305,771 | Clark | June 3, 1919 |
| 1,429,979 | Spanenberg | Sept. 26, 1922 |
| 1,663,112 | Caslow | Mar. 20, 1928 |
| 1,697,093 | Tevis | Jan. 1, 1929 |